United States Patent
Manning et al.

(10) Patent No.: US 6,294,638 B1
(45) Date of Patent: Sep. 25, 2001

(54) SOFT, TRANSPARENT AND PROCESSABLE THERMOPLASTIC POLYURETHANE

(75) Inventors: Steven C. Manning, Wheeling; Charles S. Gracik, McMechen; Arthur W. Mason, Sistersville, all of WV (US); Jack C. Chan, Coraopolis, PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/415,341

(22) Filed: Oct. 8, 1999

(51) Int. Cl.⁷ .................... C08G 18/48; C08G 18/65; C08G 18/66; C08G 18/32; C08G 18/73

(52) U.S. Cl. .................. 528/76; 528/61; 528/64; 528/65

(58) Field of Search ................. 528/65, 76, 61, 528/64

(56) References Cited

U.S. PATENT DOCUMENTS

| | | | |
|---|---|---|---|
| 4,010,146 | * | 3/1977 | Russell et al. ............ 428/376 |
| 4,532,316 | * | 7/1985 | Henn ........................ 528/59 |
| 4,597,927 | * | 7/1986 | Zeitler et al. ............. 264/85 |
| 5,545,707 | * | 8/1996 | Heidingsfeld et al. ...... 528/60 |
| 5,691,441 | * | 11/1997 | Seneker et al. ............ 528/61 |
| 5,795,948 | * | 8/1998 | Heidingsfeld et al. ...... 528/59 |

OTHER PUBLICATIONS

"Structure–Property Relationship of Transparent Polyurethane Elastomers from the Geometric Isomers of Methylene Bis(4–Cyclohexyl Isocyanate)", by Shio–wen Wong et al. pp. 77–101. IRC, (month unavailable) 1985 Kyoto.

International Rubber Conference Proceedings, Editors: Japan Society of Rubber Industry, Kyoto, Japan, Oct. 15–18, 1985, Paper 16D07, pp. 347–358, Transparent Polyurethane Elastomers and Thermoplastics: Their Synthesis and Property–Structure Relationships.

\* cited by examiner

Primary Examiner—Rabon Sergent
(74) Attorney, Agent, or Firm—Joseph C. Gil; Aron Preis

(57) ABSTRACT

A soft, transparent and processable thermoplastic polyurethane resin suitable in optical application is disclosed. The resin is the product of reacting a diisocyanate, a chain extender, and a mixture of polyether polyols. The mixture of polyether polyols comprise (A) a $C_4$ polyether polyol and (B) a $C_2$–$C_3$ polyether polyol where the weight ratio A/B is in the range of about 85/15 to 15/85.

13 Claims, No Drawings

SOFT, TRANSPARENT AND PROCESSABLE THERMOPLASTIC POLYURETHANE

The present invention is directed to a thermoplastic polyurethane resin and more particularly to a molding composition containing this resin, suitable in optical applications.

SUMMARY OF THE INVENTION

A soft, transparent and processable TPU prepared by reacting (i) a diisocyanate (ii) chain extender and (iii) a mixture of polyether polyols is disclosed. The mixture of polyetherpolyols includes (A) a $C_4$ polyether polyol and (B) a $C_2$–$C_3$ polyether polyol where the weight ratio of A/B is about 85/15 to 15/85. The inventive thermoplastic polyurethane is characterized by its clarity, processability and softness and is especially suitable in optical application.

Transparent polyurethane elastomers and thermoplastics are known and their preparation and properties have been well documented, see for instance Oertel, G, 1994 Polyurethane Handbook, $2^{nd}$ edition, New York, N.Y., Hanser Publishers. The dependence of material properties on the structure of relevant systems has been discussed in a paper entitled "Structure-Property Relationship of Transparent Polyurethane Elastomers from the Geometric Isomers of Methyelene Bis(4-cyclohexyl Isocyanate)" by Shio-Wen Wong et al. IRC '85 Kyoto; International Rubber Conference Proceedings, Editors: Japan Society of Rubber Industry, Kyoto, Japan, Oct. 15–18, 1985, Paper 16D07, p. 347–58.

The art-skilled have recognized that although transparent, the utility of the relevant resins is constrained by difficult processing and shortcomings in some important mechanical properties. A need has been established for a processable resin which would also meet the requirements for optical clarity and mechanical properties.

DETAILED DESCRIPTION OF THE INVENTION

The soft, transparent and processable thermoplastic polyurethane resin of the present invention is a product of a reaction of (i) a diisocyanate
(ii) a chain extender, and
(iii) a mixture of polyether polyols.

The diisocyanate (i) is used in an amount of about 15 to 45%, preferably 25 to 35%, the chain extender (ii) is used in an amount of about 3 to 15%, preferably 5 to 12% and the mixture of polyether polyols, reactant (iii) is used in an amount of 40% to 80%, preferably 55% to 65%; all percents are relative to the total weight of reactants (i), (ii) and (iii). A key feature of the inventive resin is the compositional makeup of the mixture of polyether polyols, reactant (iii) above. Accordingly, the components of the mixture include as component (A) a $C_4$ polyether polyol having a number average molecular weight of about 500 to 2500, and as component (B) a $C_2$–$C_3$ polyether polyol having a number average molecular weight of about 1800 g/mol to 6000. Critically, the weight ratio of A/B is in the range of about 85/15 to 15/85.

Organic diisocyanates suitable as reactant (i) in the present context are known in the art and are readily available in commerce. Diisocyanates suitable for use in the context of this invention include aliphatic, cycloaliphatic, aromatic and heterocyclic diisocyanates, all of which are known in the art, such as are disclosed in German Offenlegungsschriften 2,302,564; 2,423,764; 2,549,372; 2,402,840 and 2,457,387 incorporated by reference herein. Such diisocyanates include both substituted and unsubstituted hexamethylene diisocyanate, isophorone diisocyanate, the various tolylene, diphenyl methane and xylene diisocyanate and their hydrogenation products. Aliphatic diisocyanates are preferred. Among the aliphatic diisocyanates, mention may be made of 4,4'-diisocyanatodicyclohexyl methane, 1,6-hexamethylene diisocyanate (HDI), and hydrogenated 4,4'-biphenyl diisocyanate, isophorone diisocyanate, and cyclohexane diisocyanate. One or more aliphatic diisocyanates may be used in the practice of the invention. Most preferably, the diisocyanate reactant is 4,4'-diisocyanatodicyclohexyl methane.

The inclusion of small amounts of one or more isocyanates having more than two isocyanate groups in the molecule is permissible for as long as the resulting resin retains its thermoplasticity. Generally, the inclusion of such isocyanates should not exceed 10% relative to the weight of the diisocyanates. Examples of such isocyanates having a higher functionality include trimerized toluene diisocyanate (Desmodur IL), biuret of hexamethylene diisocyanate (Desmodur N100) and isocyanurate of hexamethylene diisocyanate (Desmodur N3300).

The chain extender suitable as reactant (ii) in the present invention is known in the art. Suitable extenders have been described in German Offenlegungsschriften 2,302,564; 2,423,764; 2,549,372; 2,402,840; 2,402,799 and 2,457,387 incorporated by reference herein. These include low molecular weight polyhydric alcohols, preferably glycols, polyamines, hydrazines and hydrazides. Aminoalcohols, such as ethanolamine, diethanol amine, N-methyldiethanolamine, triethanolamine and 3-aminopropanol may also be used. Preferred chain extenders include ethylene glycol, butylene glycol, diethylene glycol, triethylene glycol, 1,2-propanediol, tripropylene glycol, neopentyl glycol, propylene glycol, 1,4-butanediol, dicyclohexylmethanediamine, ethylene diamine, propylene diamine, isophorone diamine as well as mixtures and derivatives thereof. The preferred chain extenders are ethylene glycol, diethylene glycol, 1,4-butanediol and 1,6-hexanediol. Chain extenders with functionalities greater than 2 may also be used as long as the resulting resin retains its thermoplasticity. Examples of such extenders having higher functionalities include trimethylolpropane, glycerin, and diethylenetriamine. Generally, the addition of such chain extenders which have higher functionalities should not exceed 10 percent relative to the weight of the difunctional chain extenders.

The mixture of polyether polyols (reactant (iii)) includes, as component (A), a $C_4$ polyether polyol having a number average molecular weight of about 500 to 2500, preferably 800 to 1200 g/mol conforming structurally to

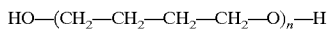

and, as component (B) a $C_2$–$C_3$ polyether polyol having a number average molecular weight of about 1800 g/mol to 6000, preferably 3500 to 4500 g/mol, conforming structurally to

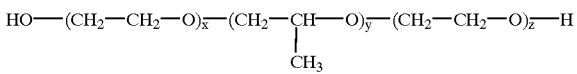

where x and z independently denote integers of 1 to 10, preferably 7 to 9, and where y denotes 35 to 80, preferably 50 to 60 and wherein the weight ratio of A/B is in the range of about 85/15 to 15/85, preferably 70/30 to 30/70.

The preparation of the inventive TPU is conventional. Procedures for making TPU have been reported in the literature (see, for instance, Saunders and Frisch, High Polymers Series, Vol 1 &2, 1964; Hsieh, K., Liao, D., Chern, Y; Thermoplastic Polyurethanes, 41, 381–395, 1997). The process for the preparation of the TPU of the invention is preferably catalyzed. Conventional catalysts for the preparation of TPU are known. Among the suitable catalysts, mention may be made of triethylamine, N,N'-dimethylpiperazine, N-methylmorpholine, titanic esters, tin diacetate, tin dioctoate, tin dilaurate, dibutyltin dilaurate, dibutyltin diacetate, tetrabutyl titanate and stannous octoate.

Conventional additives may be included in the inventive molding composition, these include lubricants (amid waxes, fatty acids, fatty acid esters, fatty alcohols, hydrocarbon waxes) UV stabilizers, hindered amine stabilizers and hydroxyphenyl benzotriazole heat stabilizers-antioxidant. In embodiments where release properties coupled with freedom from haze are desirable, the inclusion of amide wax was found to be particularly useful. The inclusion of such amide wax in amounts up to about 0.3%, preferably about 0.02 to 0.15% relative to the weight of the TPU, is particularly useful.

The characteristic term "soft", used herein in reference to the inventive TPU, refers to a Shore A hardness value of about 60 to 80 preferably 70 to 78.

The term "transparent", in context of this invention, means a property of light transmission, determined as Total Light transmission (TLT) of not less than 85%, preferably not less than 90% in accordance with ASTM 1003 measured using a Datacolor SF600 Plus-CT spectrophotometer and having a haze value of no more than 5%, preferably no more than 3% determined in accordance with ASTM 1003 measured using a Datacolor SF600 Plus-CT spectrophotometer. Measurements are made on 125 mil plaques.

The term "processable", as used in the present context, refers to the substantial absence of tackiness from and minimal agglomeration of the pellets prepared from the inventive TPU. The relative softness and tackiness are critically important in determining the suitability of TPU compositions for processing on a commercial scale. In particular, the agglomeration of the extruded strands, or the pellets, render TPU unsuitable for continuous pelletization. As used in the context of the present disclosure, substantial absence of tackiness refers to tack-free characteristic at temperatures up to about 80° C.

The invention is further illustrated but is not intended to be limited by the following examples in which all parts and percentages are by weight unless otherwise specified.

Experimental:

TPU compositions demonstrative of the invention were prepared and their properties determined as summarized below:

Sample Preparation

Reaction components were formulated based on 100 parts by weight (pbw) of the total amount of polyols (A+B) used in the reaction. The polyol mixture, or polyol A or polyol B (as noted below) was reacted with 4,4'-diisocyanatodicyclohexyl methane and 1,4 butanediol chain extender in amounts noted in the table. In all instances, the relative amounts of diisocyanate and chain extender were adjusted to yield TPU resins having comparable hardness values. The Shore A hardness value of the exemplified resins was kept constant at about 75–78.

All of the exemplified formulations additionally contained about 0.5 parts by weight of each of a UV stabilizer and UV absorber and 0.4 pbw of an antioxidant. These additives, included for their art-recognized use, are not critical to the invention.

Both a batch reaction process and a continuous reactive extrusion process were used in preparing compositions in accordance with the invention. No difference between the properties of the resulting resins was detected. In the batch reaction process, all of the raw materials (reactants (i), (ii), and (iii)) were weighed out and all of the additives were weighed out and added to reactant (iii) along with 500 ppm of dibutyl tin dilaurate as catalyst. The components and reactants were vigorously mixed, and poured into a curing tray. The samples were allowed to cure and cool to room temperature and then ground and extruded into pellet form.

In the continuous reactive extrusion process, reactants (i), (ii) and (iii) were metered into the first zone of the extruder. The exiting extruded strands were cooled and pelletized.

RESULTS

Based on experiments, it was found that the weight ratio, A/B, determines the processability of the inventive TPU. Accordingly, resins containing polyol B only (A/B=0/100) as well as TPU where the ratios are 17/83, 33/67, 50/50 and 67/33 were deemed processable. The corresponding TPU resins where the ratio was 83/17 was found to be marginally processable and those based on polyol A only, that is not polyol B, were not processable at all. All the TPU resins used in the experiments contained about 0.1 percent by weight of amide wax. The TPUs containing at least about 17% polyol B in the total polyol (A+B) demonstrated less agglomeration through the process and were at least marginally processable. However, the corresponding TPU based on less than 15% polyol B were extremely difficult to process. Typical problems that were encountered in attempting to process such TPU include: 1) strands wrapping around the pelletizer cutters and 2) extreme agglomeration of the pellets.

The optical clarity of the inventive TPU resins has been determined by measuring the haze and total light transmittance (TLT) of injection molded plaques. These values were measured in accordance with ASTM 1003 using a Datacolor SF600 Plus-CT spectrophotometer; measurements made on plaques having a thickness of 125 mils.

The optical properties of the TPU resins were found to depend on the relative amounts of polyols A and B. The TPU materials which are based on high contents of polyol B, approached 100% haze with relatively low TLT. However, as the relative content of polyol B decreased to less than 75% of the total polyol content, the % haze drastically dropped and approached 0%.

TABLE

| Relative amounts reactants of A and B, (A/B) | Diisocyanate (pbw) | 1,4-butanediol (pbw) | Haze (%) | TLT (%) |
|---|---|---|---|---|
| 100/0 | 67.24 | 14 | 1.8 | 90.7 |
| 83/17 | 62.22 | 13.4 | 2.0 | 91.1 |
| 67/33 | 57.08 | 12.75 | 2.0 | 91.1 |
| 50/50 | 52.48 | 12.3 | 2.1 | 91.1 |
| 33/67 | 47.92 | 11.85 | 1.7 | 91.0 |
| 17/83 | 43.63 | 11.5 | 95.4 | 37.9 |
| 0/100 | 38.88 | 11 | 99.9 | 34.0 |

*pbw = parts by weight

COMPARATIVE EXAMPLES

1. Thermoplastic polyurethane resin based entirely on $C_2$–$C_3$ polyether polyol was prepared and evaluated. In this example, 100 parts by weight (pbw) of the polyol were reacted with 12.68 pbw of 1,4-butanediol chain extender and with 43.78 pbw of 4,4'-diisocyanatodicyclohexyl methane. The resulting TPU resin had a hardness value (Shore A) of about 75–78. Although the resin processed well, its strands were translucent.

2. A thermoplastic polyurethane resin prepared from relevant reactants, except that the presently required ratio of A/B was made and its properties evaluated. Accordingly, 90 pbw of $C_2$–$C_3$ polyether polyol, 10 pbw of $C_4$-polyether polyol, 11.45 pbw of 1,4 butanediol chain extender and 42.2 pbw of 4,4'-diisocyanatodicyclohexyl methane were reacted to produce a resin. The material (Shore A hardness of 75–78) was noted to be processable yet its extruded strands were translucent.

Although the invention has been described in detail in the foregoing for the purpose of illustration, it is to be understood that such detail is solely for that purpose and that variation can be made therein by those skilled in the art without departing from the spirit and scope of the invention except as it may be limited by the claims.

What is claimed is:

1. A soft, transparent and processable thermoplastic polyurethane resin having a shore A hardness of about 60 to 80, prepared by reacting (i) about 15 to 45% of at least one duisocyanate, and (ii) 3 to 15% of at least one chain extender, and (iii) 40 to 80% of a mixture of polyether polyols, said percents being in relation to the total weight of (i), (ii) and (iii), said mixture of polyether polyols comprising (A) a $C_4$ polyether polyol having a number average molecular weight of about 500 to 2500 g/mol conforming structurally to

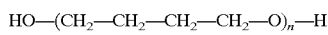

and (B) a $C_2$–$C_3$ polyether polyol having a number average molecular weight of about 2100 to 6000 g/mol, conforming structurally to

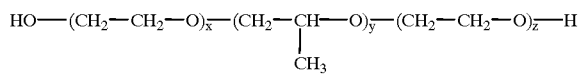

where x and z independently denote integers of 1 to 10 and where y denotes an integer of 35 to 80, and where the weight ratio A/B is in the range of about 85/15 to 30/70.

2. The thermoplastic polyurethane resin of claim 1 wherein said resin is prepared by reacting (i) about 25 to 35% of at least one diisocyanate, and (ii) 5 to 12% of at least one chain extender, and (iii) 55 to 65% of a mixture of polyether polyols, said percents being in relation to the sum total of (i) (ii) and (iii).

3. The thermoplastic polyurethane resin of claim 1 wherein said $C_4$ polyether polyol has a number average molecular weight of about 800 to 1200 g/mol.

4. The thermoplastic polyurethane resin of claim 1 wherein said $C_2$–$C_3$ polyether polyol has a number average molecular weight of about 3500 to 4500 g/mol.

5. The thermoplastic polyurethane resin of claim 1 wherein said ratio of A/B is about 70/30 to 30/70.

6. The thermoplastic polyurethane resin of claim 1 wherein shore A hardness is about 70 to 78.

7. A soft, transparent and processable thermoplastic polyurethane resin having a shore A hardness of about 70 to 78, prepared by reacting (i) about 25 to 35% of at least one diisocyanate, and (ii) 5 to 12% of at least one chain extender, and (iii) 55 to 65% of a mixture of polyether polyols, said percents being in relation to the total weight of (i), (ii) and (iii), said mixture comprising as reactant (A) a $C_4$ polyether polyol having a number average molecular weight of about 800 to 1200 g/mol conforming structurally to

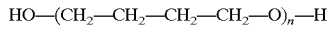

and (B) a $C_2$–$C_3$ polyether polyol having a number average molecular weight of about 3500 to 4500 g/mol, conforming structurally to

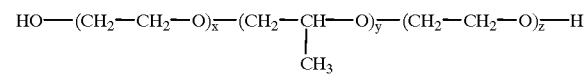

where x and z independently denote integers of 7 to 9, and where y denotes 50 to 60 and wherein the weight ratio of A/B is in the range of about 70/30 to 30/70.

8. The thermoplastic polyurethane resin of claim 1 wherein diisocyanate is aliphatic.

9. The thermoplastic polyurethane resin of claim 8 wherein aliphatic diisocyanate is at least one member selected from the group consisting of 4,4'-diisocyanatodicyclohexyl methane, 1,6-hexamethylene diisocyanate, hydrogenated 4,4'-biphenyl diisocyanate, isophorone diisocyanate and cyclohexane diisocyanate.

10. The thermoplastic polyurethane resin of claim 8 wherein aliphatic diisocyanate is 4,4'-diisocyanatodicyclohexyl methane.

11. The thermoplastic polyurethane resin of claim 8 wherein chain extender is at least one member selected from the group consisting of ethylene glycol, butylene glycol, diethylene glycol, triethylene glycol, 1,2-propanediol, tripropylene glycol, neopentyl glycol, propylene glycol, 1,4 butanediol, dicyclohexylmethanediamine, ethylene diamine, propylene diamine and isophorone diamine.

12. The thermoplastic polyurethane resin of claim 11 wherein chain extender is at least one member selected from the group consisting of ethylene glycol, diethylene glycol, 1,4 butanediol and 1,6-hexanediol.

13. A soft, transparent and processable thermoplastic polyurethane resin having a shore A hardness of about 70 to 78, prepared by reacting (i) about 25 to 35% of at least one aliphatic diisocyanate, and (ii) 5 to 12% of at least one chain extender selected from the group consisting of ethylene glycol, diethylene glycol, 1,4 butanediol and 1,6-hexane diol, and (iii) 55 to 65% of a mixture of polyether polyols, said percents being in relation to the total weight of (i), (ii) and (iii), said mixture of polyether polyols comprising (A) a $C_4$ polyether polyol having a number average molecular weight of about 800 to 1200 g/mol conforming structurally to

and (B) a $C_2$–$C_3$ polyether polyol having a number average molecular weight of about 3500 to 4500 g/mol, conforming structurally to

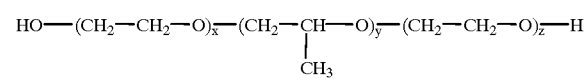

where x and z independently denote integers of 7 to 9, and where y denotes 50 to 60 and wherein the weight ratio of A/B is in the range of about 70/30 to 30/70.

* * * * *